United States Patent
Sun et al.

(10) Patent No.: US 9,826,298 B2
(45) Date of Patent: **\*Nov. 21, 2017**

(54) LED LIGHTING DEVICE, WIRELESS SPEAKER SYSTEM, AND WIRELESS AUDIO PLAYING METHOD

(71) Applicant: SENGLED OPTOELECTRONICS CO., LTD., Tongxiang (CN)

(72) Inventors: Chaoqun Sun, Tongxiang (CN); Xia Wang, Tongxiang (CN); Jinxiang Shen, Tongxiang (CN)

(73) Assignee: SENGLED OPTOELECTRONICS CO., LTD, Tongxiang (CN)

( * ) Notice: Subject to any disclaimer, the term of this patent is extended or adjusted under 35 U.S.C. 154(b) by 45 days.

This patent is subject to a terminal disclaimer.

(21) Appl. No.: 14/780,515

(22) PCT Filed: Mar. 31, 2015

(86) PCT No.: PCT/CN2015/075482
§ 371 (c)(1),
(2) Date: Sep. 25, 2015

(87) PCT Pub. No.: WO2015/149680
PCT Pub. Date: Oct. 8, 2015

(65) Prior Publication Data
US 2016/0057521 A1  Feb. 25, 2016

(30) Foreign Application Priority Data

Apr. 4, 2014 (CN) .......................... 2014 1 0135711

(51) Int. Cl.
*H04R 1/02* (2006.01)
*H05B 37/02* (2006.01)
*H04R 3/00* (2006.01)

(52) U.S. Cl.
CPC .............. *H04R 1/028* (2013.01); *H04R 3/00* (2013.01); *H05B 37/0272* (2013.01); *H04R 2420/07* (2013.01)

(58) Field of Classification Search
None
See application file for complete search history.

(56) References Cited

U.S. PATENT DOCUMENTS 9,172,917 B1 * 10/2015 Fu .......................... H04N 7/18
2007/0142024 A1 * 6/2007 Clayton ................. H04H 20/08
455/403

(Continued)

FOREIGN PATENT DOCUMENTS

CN 202425021 U 9/2012
CN 103501558 A 1/2014

(Continued)

OTHER PUBLICATIONS

Strange, Adario. "Smart Light Bulb Doubles as Bluetooth Speaker." pp. 1-2. Mar. 19, 2014.*

(Continued)

*Primary Examiner* — Curtis Kuntz
*Assistant Examiner* — Qin Zhu
(74) *Attorney, Agent, or Firm* — Anova Law Group, PLLC

(57) ABSTRACT

A wireless speaker system is provided. The system includes at least one main light emitting diode (LED) lighting device including a wireless fidelity (Wi-Fi) radio frequency module and a wireless audio module. The system also includes at least one auxiliary LED lighting device including the wireless audio module. Further, the system includes a smart terminal. The main LED lighting device is wirelessly connected to the smart terminal through the built-in Wi-Fi radio frequency module. The smart terminal sends an audio signal (Continued)

to the main LED lighting device, and then the wireless audio module in the main LED lighting device transmits the audio signal to the auxiliary LED lighting device. The auxiliary LED lighting device sends feedback information to the smart terminal through the main LED lighting device.

16 Claims, 2 Drawing Sheets

(56) References Cited

U.S. PATENT DOCUMENTS

| | | | | |
|---|---|---|---|---|
| 2008/0175399 A1* | 7/2008 | Kim | ......................... | H03G 3/32 |
| | | | | 381/57 |
| 2008/0279138 A1* | 11/2008 | Gonikberg | ............ | H04W 8/005 |
| | | | | 370/328 |
| 2011/0317846 A1* | 12/2011 | Yuan | ................... | F21V 33/0056 |
| | | | | 381/77 |
| 2013/0198786 A1* | 8/2013 | Cook | ................. | H05B 37/0272 |
| | | | | 725/81 |
| 2013/0272276 A1* | 10/2013 | Sakamoto | ............. | H04W 72/12 |
| | | | | 370/336 |
| 2014/0009068 A1* | 1/2014 | Ivey | ................... | H05B 33/0854 |
| | | | | 315/152 |
| 2014/0064513 A1* | 3/2014 | Behringer | ................ | H04R 3/00 |
| | | | | 381/77 |
| 2014/0133400 A1* | 5/2014 | Ruan | ....................... | H04W 4/18 |
| | | | | 370/328 |
| 2014/0252958 A1* | 9/2014 | Subotnick | .......... | H05B 37/0218 |
| | | | | 315/149 |
| 2014/0254577 A1* | 9/2014 | Wright | .................. | H04W 12/04 |
| | | | | 370/338 |
| 2014/0273818 A1* | 9/2014 | Sallas | .................... | H04W 8/005 |
| | | | | 455/41.1 |
| 2014/0273892 A1* | 9/2014 | Nourbakhsh | ........ | H04B 1/3827 |
| | | | | 455/90.3 |
| 2014/0285113 A1* | 9/2014 | Huang | ............... | H05B 37/0272 |
| | | | | 315/297 |
| 2015/0043212 A1* | 2/2015 | Coffey | .................. | F21V 23/045 |
| | | | | 362/294 |
| 2015/0120000 A1* | 4/2015 | Coffey | ................ | H04L 12/2803 |
| | | | | 700/13 |
| 2015/0236848 A1* | 8/2015 | Ma | .......................... | H04L 7/042 |
| | | | | 370/328 |

FOREIGN PATENT DOCUMENTS

| | | |
|---|---|---|
| CN | 203554727 U | 4/2014 |
| CN | 103925583 A | 7/2014 |
| CN | 103929687 A | 7/2014 |
| CN | 103974512 A | 8/2014 |
| CN | 203810352 U | 9/2014 |
| CN | 203813918 U | 9/2014 |
| WO | 2013091330 A1 | 6/2013 |

OTHER PUBLICATIONS

Schroeder, Stan. "Smartphone-Controlled Light Bulb Raises $260,000 on Kickstarter." pp. 1-2. Sep. 17, 2012.*
The World Intellectual Property Organization (WIPO) International Search Report for PCT/CN2015/075482 dated Jun. 30, 2015.

* cited by examiner

LED LIGHTING DEVICE, WIRELESS SPEAKER SYSTEM, AND WIRELESS AUDIO PLAYING METHOD

CROSS-REFERENCES TO RELATED APPLICATIONS

This application is a national stage application under 35 USC §371(c) of PCT Application No. PCT/CN2015/075482, entitled "LED LIGHTING DEVICE, WIRELESS SPEAKER SYSTEM, AND WIRELESS AUDIO PLAYING METHOD," filed on Mar. 31, 2015, which claims priority from Chinese Patent Application No. 201410135711.X, filed on Apr. 4, 2014. The entire disclosure and contents of the above applications are hereby incorporated by reference herein.

FIELD OF THE INVENTION

The present disclosure generally relates to the field of light emitting diode (LED) lighting technology and, more particularly, relates to an LED lighting device, a wireless speaker system and a wireless audio playing method.

BACKGROUND

Digital Living Network Alliance (DLNA) is a collaborative trade organization established by Sony, Intel, Microsoft, etc. DLNA is responsible for defining interoperability guidelines to enable unlimited sharing of digital media and content services between multimedia devices, such as personal computers (PCs), consumer electronics and mobile devices. Airplay is a playing technology added in iOS 4.2 and OS X Mountain Lion by Apple Company. By using the Airplay technology, video mirroring on iPhone, iPod touch, iPad and Mac can be transmitted to devices (e.g., speaker, Apple TV, AirPort Express) that support Airplay.

LED lighting may generally provide advantages in energy conservation, environmental protection, controllable lighting, solid state lighting, and long operational lifetime. LED lamps thus have been widely used in various areas for public, commercial, and/or indoor lightings.

A wireless speaker system can be combined with a LED lighting device. Through DLNA or Airplay technology, a smart terminal can share an audio signal with the LED lighting device that supports the DLNA or Airplay technology. However, in an existing system of the wireless speaker with the LED lighting device, when playing the audio signal, a specific wireless transmitting telephone needs to be added to control and send the audio signal. The size of such a wireless transmitting telephone is large and the cost is expensive, which is not a good match for growing smart terminals, such as smart mobile phones. In addition, the compatibility for such a wireless transmitting telephone is poor. It is usually unable to adapt to the needs of more occasions. Further, the existing wireless speaker system may only include a single LED lighting device and can only play in mono. Therefore, a stereo wireless speaker system may be desirable to meet user needs.

The disclosed LED lighting devices, wireless speaker systems, and wireless audio playing methods are directed to solve one or more problems set forth above and other problems.

BRIEF SUMMARY OF THE DISCLOSURE

One aspect of the present disclosure provides a wireless speaker system. The system includes at least one main light emitting diode (LED) lighting device including a wireless fidelity (Wi-Fi) radio frequency module and a wireless audio module. The system also includes at least one auxiliary LED lighting device including the wireless audio module. Further, the system includes a smart terminal, where the main LED lighting device is wirelessly connected to the smart terminal through the built-in Wi-Fi radio frequency module; the smart terminal sends an audio signal to the main LED lighting device, and then the wireless audio module in the main LED lighting device transmits the audio signal to the auxiliary LED lighting device; and the auxiliary LED lighting device sends feedback information to the smart terminal through the main LED lighting device.

Another aspect of the present disclosure provides a wireless audio playing method. The method includes providing a main LED lighting device and at least one auxiliary LED lighting device, where the main LED lighting device includes a Wi-Fi radio frequency module and a wireless audio module, and the auxiliary LED lighting device includes the wireless audio module. The method also includes receiving the audio signal by the main LED lighting device and sending the audio signal to the auxiliary LED lighting device through the wireless audio module in the main LED lighting device. Further, the method includes sending feedback information to the smart terminal through the main LED lighting device by the auxiliary LED lighting device.

Another aspect of the present disclosure provides an LED lighting device. The device includes a main LED lighting device including a power supply module, a light emitting module connected to the power supply module, an electroacoustic conversion unit, a Wi-Fi radio frequency module, and a wireless audio module connected to the power supply module. The device also includes an auxiliary LED lighting device including a power supply module, a light emitting module connected to the power supply module, an electroacoustic conversion unit configured to play audio, and a wireless audio module connected to the power supply module.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
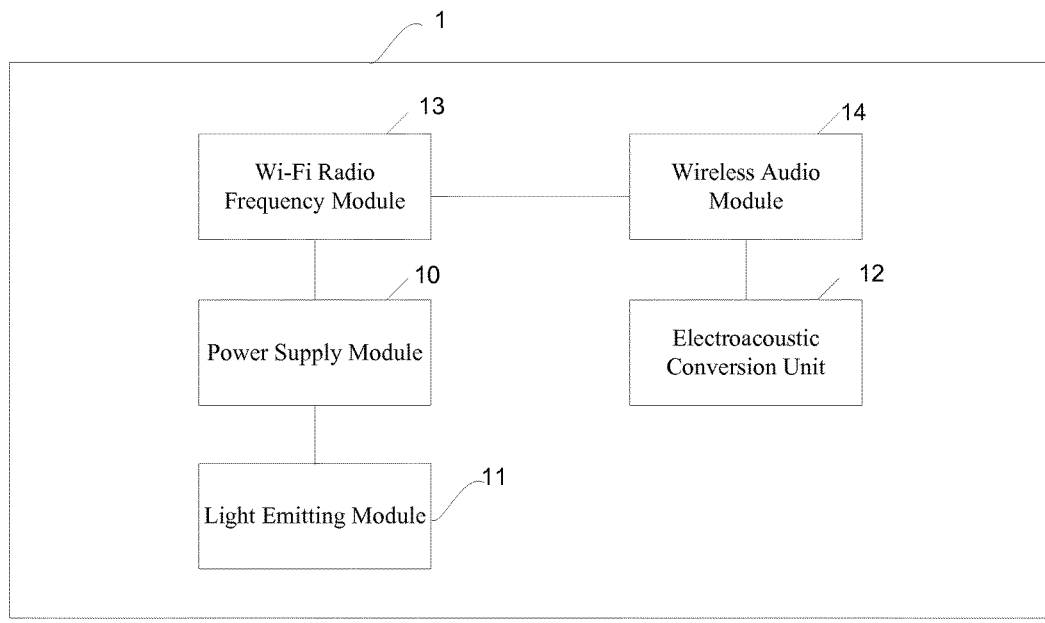
FIG. 1 illustrates a schematic diagram of an exemplary main LED lighting device consistent with the disclosed embodiments.
Figure 2:
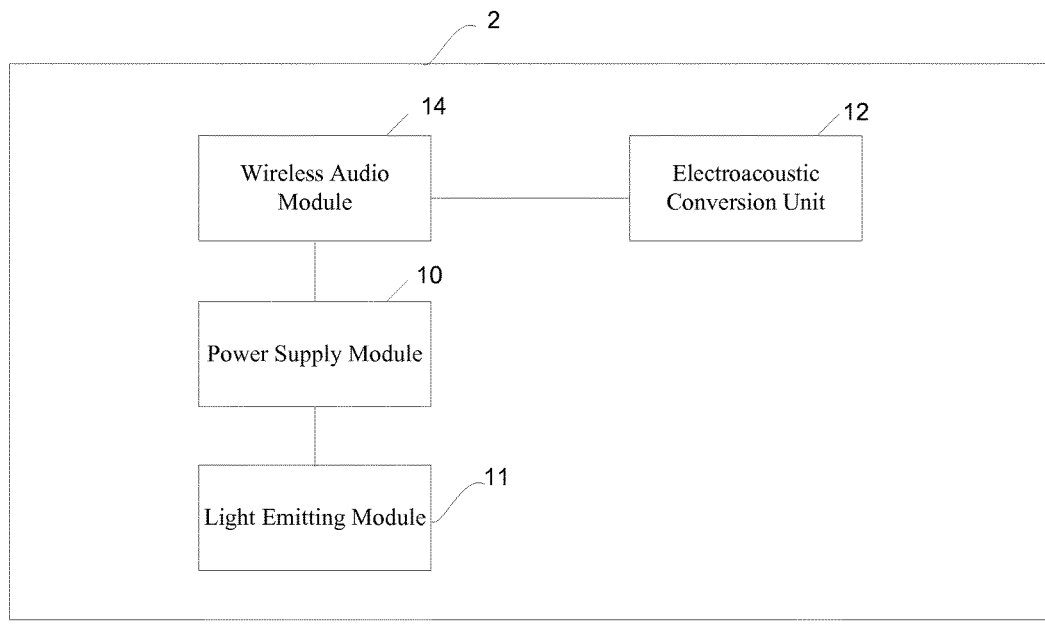
FIG. 2 illustrates a schematic diagram of an exemplary auxiliary LED lighting device consistent with the disclosed embodiments.

FIG. 1 illustrates a schematic diagram of an exemplary main LED lighting device consistent with the disclosed embodiments. FIG. 2 illustrates a schematic diagram of an exemplary auxiliary LED lighting device consistent with the disclosed embodiments. As shown in FIG. 1 and FIG. 2, an exemplary LED lighting and speaker system includes a main LED lighting device 1 and an auxiliary LED lighting device 2. Similar to the structure of conventional LED lamps, the main LED lighting device 1 and the auxiliary LED lighting device 2 include a power supply module 10 and a light emitting module 11 connected to the power supply module. The power supply module 10 and the light emitting module 11 are configured to provide a power source for the LED lighting device. In addition, the main LED lighting device 1 and the auxiliary LED lighting device 2 also include an electroacoustic conversion unit 12, respectively.

The difference between the main LED lighting device 1 and the auxiliary LED lighting device 2 is that the main LED lighting device 1 includes a wireless fidelity (Wi-Fi) radio frequency module 13 and a wireless audio module 14, whereas the auxiliary LED lighting device only includes the wireless audio module 14. The Wi-Fi radio frequency module 13 in the main LED lighting device employs Digital Living Network Alliance (DLNA) or Airplay access mechanisms. That is, the Wi-Fi radio frequency module 13 and a smart terminal 4 can be used to access a same Wi-Fi router 3, such that the Wi-Fi radio frequency module 13 can communicate with the smart terminal 4, and the wireless audio module 14 in the main LED lighting device 1 can communicate with the wireless audio module 14 in the auxiliary LED lighting device 2. The wireless audio module 14 in the main LED lighting device 1 is configured to receive a data signal through the Wi-Fi radio frequency module 13, convert and send the data signal to the wireless audio module 14 in the auxiliary LED lighting device 2.

Figure 3:
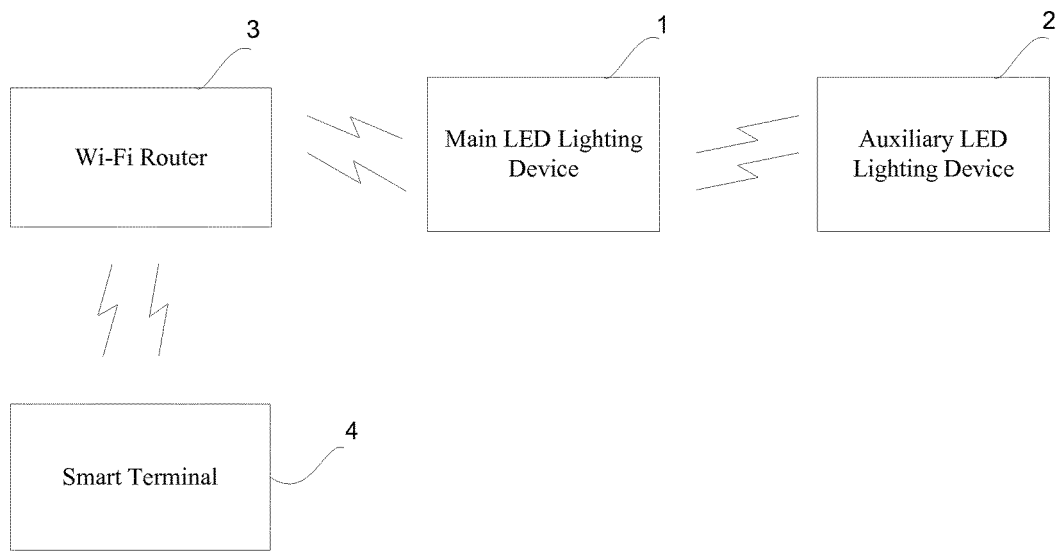
FIG. 3 illustrates a structure diagram of an exemplary wireless speaker system consistent with the disclosed embodiments.

FIG. 3 illustrates a structure diagram of an exemplary wireless speaker system consistent with the disclosed embodiments. As shown in FIG. 3, the wireless speaker system includes at least one main LED lighting device 1, at least one auxiliary LED lighting device 2, a Wi-Fi router 3 and a smart terminal 4. The main LED lighting device 1 and the smart terminal 4 are connected to a wireless network through the Wi-Fi router 3, whereas the auxiliary LED lighting device 2 is not directly connected to the Wi-Fi router 3. An audio signal sent by the smart terminal 4 is transmitted to the main LED lighting device 1 through the Wi-Fi router 3. Then, the audio signal is transmitted to the auxiliary LED lighting device 2 through the main LED lighting device 1. The auxiliary LED lighting device 2 sends feedback information to the smart terminal 4 through the main LED lighting device 1. The main LED lighting device 1 and the auxiliary LED lighting device 2 form a multichannel wireless speaker system which supports DLNA or Airplay technologies through their respective wireless audio module 14, such that the audio signal can be wirelessly synched to the LED lighting device from the smart terminal 4.

Further, if the Wi-Fi router 3 is connected to Internet, the main LED lighting device 1 is wirelessly connected to the Internet through the built-in Wi-Fi radio frequency module 13 and the Wi-Fi router 3. The audio signal on the Internet can then be sent to the LED lighting device, realizing the audio signal playing over the cloud computing architecture.

Figure 4:
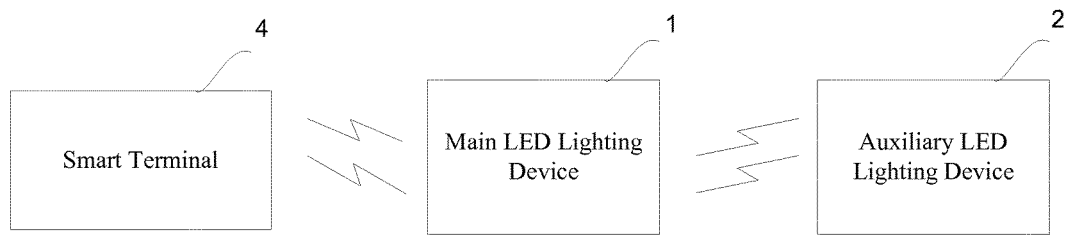
FIG. 4 illustrates a structure diagram of another exemplary wireless speaker system consistent with the disclosed embodiments.

FIG. 4 illustrates a structure diagram of another exemplary wireless speaker system consistent with the disclosed embodiments. As shown in FIG. 4, a smart terminal 4 can be connected directly to a main LED lighting device 1 through Wi-Fi. In the present embodiment, the wireless speaker system includes at least one main LED lighting device 1, at least one auxiliary LED lighting device 2 and the smart terminal 4. The main LED lighting device 1 includes a Wi-Fi radio frequency module 13 and a wireless audio module 14. The auxiliary LED lighting device 2 includes a wireless audio module 14. The main LED lighting device 1 connects wirelessly to the smart terminal 4 through the built-in Wi-Fi radio frequency module 13. The smart terminal 4 sends an audio signal to the main LED lighting device 1. Then, the audio signal is transmitted to the auxiliary LED lighting device 2 through the wireless audio module 14 of the main LED lighting device 1. The auxiliary LED lighting device 2 sends feedback information to the smart terminal 4 through the main LED lighting device 1. The main LED lighting device 1 and the auxiliary LED lighting device 2 form a multichannel wireless speaker system, such that the audio signal can be played by the LED lighting device.

The number of the auxiliary LED lighting devices can be configured according to needs. For example, multiple LED lighting devices can be used to form a wireless speaker system with 2.0, 2.1, 4.1, 5.1, 7.1 sound channels.

In addition, the Wi-Fi radio frequency module 13 of the main LED lighting device 1 may use 2.4G or 5G Wi-Fi technology. The smart terminal 4 can be a mobile phone, a tablet personal computer (PC), desktop computer, an Ultrabook, a smart TV, or a cloud server.

Comparing to existing technologies, in the present embodiment, the Wi-Fi radio frequency module 13 is only set in the main LED lighting device 1, whereas the Wi-Fi radio frequency module 13 is not included in the auxiliary LED lighting device 2. The bandwidth of the wireless audio module from the main LED lighting device 1 to the auxiliary LED lighting device is exclusively for audio transmission, improving the real-time performance and fluency of the different audio channels.

In various embodiments, the main LED lighting device 1 can be configured as one single device. For example, the at least one power supply unit, the at least one wireless audio module, the at least one Wi-Fi radio frequency module, and the at least one electroacoustic conversion unit, can be integrated into the one LED lighting device 1 to form the single device. Accordingly, the multifunctional speaker system can include a plurality of the multifunctional LED devices each configured as one single device.

In an exemplary main LED lighting device 1, the electroacoustic conversion unit can be integrated together with driver circuit of the LED drive and power supply module to save space and to reduce wire loss on of a distributed design. In one embodiment, an embedded antenna can be included in the integrated main LED lighting device 1. The embedded antenna can be configured to fit a shape of the lamp body of the main LED lighting device 1 without increasing the size of the resultant device and to maintain the design of the resultant device.

In various embodiments, the Wi-Fi radio frequency module 13 may also be configured with automatic frequency hopping functions to avoid interference with other radio devices. Furthermore, noise reduction and/or echo cancellation technologies can be applied using software and hardware products to provide the main LED lighting device 1 with desired audio effects.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The wireless speaker system includes at least one main light emitting diode (LED) lighting device including a wireless fidelity (Wi-Fi) radio frequency module and a wireless audio module. The system also includes at least one auxiliary LED lighting device including the wireless audio module. Further, the system includes a smart terminal. The main LED lighting device is wirelessly connected to the smart terminal through the built-in Wi-Fi radio frequency module. The smart terminal sends an audio signal to the main LED lighting device, and then the wireless audio module in the main LED lighting device transmits the audio signal to the auxiliary LED lighting device. The auxiliary LED lighting device sends feedback information to the smart terminal through the main LED lighting device.

In some embodiments, the main LED lighting device 1 may include one or more sensors for detecting objects or movements of objects in a room. For example, in a room using multiple main LED lighting devices 1 to implement a wireless multifunctional speaker system, the sensors integrated in the main LED lighting devices 1 may detect the position and movements of the a person in the room. The multifunctional wireless speaker system may then adjust the main LED lighting device(s) 1 and the auxiliary LED lighting device(s) 2 close to the person and main LED lighting device(s) 1 and the auxiliary LED lighting device(s) 2 far away from the person accordingly to various algorithms to better broadcast the audio signals. For example, the speaker system may amplify certain frequency bands in the main or auxiliary LED devices close to the person. In another example, the speaker system may also adjust the lighting (e.g., dimming) in the main or auxiliary LED devices far away from the person. A user may further use the smart terminal to adjust the audio and/or lighting audio effects.

Comparing to existing technologies, the Wi-Fi radio frequency module is only set in the main LED lighting device, whereas the Wi-Fi radio frequency module is not set in the auxiliary LED lighting device. The bandwidth of the wireless audio module from the main LED lighting device to the auxiliary LED lighting device is exclusive audio transmission, improving the real-time performance and fluency of the different audio channels.

REFERENCE SIGN LIST

Main LED lighting device 1
Auxiliary LED lighting device 2
Wi-Fi router 3
Smart terminal 4
Power supply module 10
Light emitting module 11
Electroacoustic conversion unit 12
Wi-Fi radio frequency module 13
Wireless audio module 14

What is claimed is:

1. A wireless speaker system, comprising:
a main light emitting diode (LED) lighting device including a wireless fidelity (Wi-Fi 802.11) radio frequency module and a wireless audio module;
an auxiliary LED lighting device including the wireless audio module; and
a smart terminal, wherein:
the main LED lighting device is wirelessly connected to the smart terminal through the built-in Wi-Fi radio frequency module;
the smart terminal sends an audio signal to the main LED lighting device, and then the wireless audio module in the main LED lighting device transmits the audio signal to the auxiliary LED lighting device;
the auxiliary LED lighting device sends feedback information to the smart terminal through the main LED lighting device; and
the smart terminal controls the main LED lighting device and the auxiliary LED lighting device according to data received from the main LED lighting device.

2. The system according to claim 1, wherein:
when the smart terminal is connected to the Internet, the smart terminal sends the audio signal on the Internet to the main LED lighting device and the auxiliary LED lighting device, playing the audio signal received from a cloud.

3. The system according to claim 1, wherein:
the Wi-Fi radio frequency module is one of a Wi-Fi radio frequency module with 2.4 GHz Wi-Fi technology and a Wi-Fi radio frequency module with 5 GHz Wi-Fi technology.

4. The system according to claim 1, wherein:
the smart terminal is one of a mobile phone, a tablet personal computer, a desktop computer, an Ultrabook, a smart TV, and a cloud server.

5. The system according to claim 1, further including:
a Wi-Fi router, wherein:
the main LED lighting device and the smart terminal are connected to the wireless network through the Wi-Fi router;
an audio signal sent by the smart terminal is transmitted to the main LED lighting device through the Wi-Fi router, and then the audio signal is transmitted to the auxiliary LED lighting device through the wireless audio module in the main LED lighting device;
the auxiliary LED lighting device sends feedback information to the smart terminal through the main LED lighting device; and
the main LED lighting device and the auxiliary LED lighting device form a multichannel wireless speaker system that supports one of Digital Living Network Alliance (DLNA) and Airplay technologies.

6. The system according to claim 5, wherein:
when the Wi-Fi router is connected to the Internet, the main LED lighting device is wirelessly connected to the Internet through the built-in Wi-Fi radio frequency module and the Wi-Fi router, such that the audio signal on the Internet is sent to the main LED lighting device, realizing playing the audio signal over a cloud.

7. A wireless audio playing method, comprising:
providing a main LED lighting device and at least one auxiliary LED lighting device, wherein the main LED lighting device includes a Wi-Fi (802.11) radio frequency module and a wireless audio module, and the auxiliary LED lighting device includes the wireless audio module;
receiving an audio signal by the main LED lighting device and sending the audio signal to the auxiliary LED lighting device through the wireless audio module in the main LED lighting device;
sending feedback information to the smart terminal through the main LED lighting device by the auxiliary LED lighting device; and
controlling the main LED lighting device and the auxiliary LED lighting device according to data collected by the main LED lighting device.

8. The method according to claim 7, wherein:
when the smart terminal is connected to the Internet, the smart terminal sends the audio signal on the Internet to the main LED lighting device and the auxiliary LED lighting device, playing the audio signal received from a cloud.

9. The method according to claim 7, wherein:
the Wi-Fi radio frequency module of the main LED lighting device is one of a Wi-Fi radio frequency module with 2.4 GHz Wi-Fi technology and a Wi-Fi radio frequency module with 5 GHz Wi-Fi technology.

10. The method according to claim 7, further including:
connecting the main LED lighting device to a Wi-Fi router through the built-in Wi-Fi radio frequency module;
connecting wirelessly a smart terminal to the Wi-Fi router and sending an audio signal by the smart terminal;
receiving the audio signal by the main LED lighting device and transmitting the audio signal to the auxiliary LED lighting device through the wireless audio module in the main LED lighting device; and
sending feedback information to the smart terminal through the main LED lighting device by the auxiliary LED lighting device.

11. The method according to claim 10, wherein:
when the Wi-Fi router is connected to the Internet, the main LED lighting device is wirelessly connected to the Internet through the built-in Wi-Fi radio frequency module and the Wi-Fi router, such that the audio signal on the Internet is sent to the LED lighting device, realizing playing the audio signal over the cloud.

12. An LED lighting device, comprising:
a main LED lighting device including a power supply module, a light emitting module connected to the power supply module, an electroacoustic conversion unit, a Wi-Fi (802.11) radio frequency module, and a wireless audio module connected to the power supply module; and
an auxiliary LED lighting device including a power supply module, a light emitting module connected to the power supply module, an electroacoustic conversion unit, and a wireless audio module connected to the power supply module;
wherein:
the main LED lighting device is wirelessly connected to a smart terminal through the built-in Wi-Fi radio frequency module;
the smart terminal sends an audio signal to the main LED lighting device, and then the wireless audio module in the main LED lighting device transmits the audio signal to the auxiliary LED lighting device;
the auxiliary LED lighting device sends feedback information to the smart terminal through the main LED lighting device; and
the smart terminal controls the main LED lighting device and the auxiliary LED lighting device according to data received from the main LED lighting device.

13. The device according to claim 12, wherein:
the power supply module and the light emitting module are configured to provide a power source for the LED lighting device; and
the electroacoustic conversion unit configured to play audio;
the wireless audio module of the main LED lighting device is configured to:
receive a data signal through the Wi-Fi radio frequency module; and
convert and send the data signal to the wireless audio module in the auxiliary LED lighting device.

14. The device according to claim 12, wherein:
the Wi-Fi radio frequency module of the main LED lighting device is one of a Wi-Fi radio frequency module with 2.4 GHz Wi-Fi technology and a Wi-Fi radio frequency module with 5 GHz Wi-Fi technology.

15. The device according to claim 12, further comprising a Wi-Fi router, wherein:
the main LED lighting device and the smart terminal are connected to the wireless network through the Wi-Fi router;
the audio signal sent by the smart terminal is transmitted to the main LED lighting device through the Wi-Fi router, and then the audio signal is transmitted to the auxiliary LED lighting device through the wireless audio module in the main LED lighting device;
the auxiliary LED lighting device sends feedback information to the smart terminal through the main LED lighting device; and
the main LED lighting device and the auxiliary LED lighting device form a multichannel wireless speaker system that supports one of Digital Living Network Alliance (DLNA) and Airplay technologies.

16. The device according to claim 15, wherein:
when the Wi-Fi router is connected to the Internet, the main LED lighting device is wirelessly connected to the Internet through the built-in Wi-Fi radio frequency module and the Wi-Fi router, such that the audio signal on the Internet is sent to the main LED lighting device, realizing playing the audio signal over a cloud.

* * * * *